United States Patent [19]

Pavelescu

[11] Patent Number: 5,732,479
[45] Date of Patent: Mar. 31, 1998

[54] SHOE WITH LAMINATE EMBEDDED IN SPRAY-MOULDED COMPOUND SOLE

[75] Inventor: Liviu Mihai Pavelescu, Dortmund, Germany

[73] Assignee: Akzo Nobel NV, Arnhem, Netherlands

[21] Appl. No.: 607,039

[22] Filed: Feb. 26, 1996

[30] Foreign Application Priority Data

Mar. 2, 1995 [DE] Germany ............ 195 07 210.3
Apr. 8, 1995 [DE] Germany ............ 195 13 412.5

[51] Int. Cl.$^6$ ............................................. A43C 13/08
[52] U.S. Cl. .................................. 36/12; 36/14; 36/55
[58] Field of Search ........................ 36/12, 14, 3 R, 36/3 A, 4, 45, 55, 9 R

[56] References Cited

U.S. PATENT DOCUMENTS

| | | | |
|---|---|---|---|
| 1,278,140 | 9/1918 | Golden | 36/14 |
| 2,071,431 | 2/1937 | Riddell | 36/14 |
| 2,284,620 | 6/1942 | Jayne | 36/14 |
| 3,129,519 | 4/1964 | Hardy | 36/14 |
| 4,068,395 | 1/1978 | Senter | 36/14 |
| 4,819,345 | 4/1989 | Mulcahy et al. | 36/12 |
| 4,899,465 | 2/1990 | Bleimhofer et al. | 36/12 |
| 5,285,546 | 2/1994 | Haimerl | 36/12 |
| 5,418,044 | 5/1995 | Rolf-Dirk Mahler | 428/196 |
| 5,505,011 | 4/1996 | Bleimhofer | 36/55 |

FOREIGN PATENT DOCUMENTS

| | | |
|---|---|---|
| 0 544 270 A1 | 6/1993 | European Pat. Off. . |
| 0 629 359 A3 | 12/1994 | European Pat. Off. . |
| 0 679 347 A3 | 11/1995 | European Pat. Off. . |
| 3821602 | 6/1988 | Germany . |

OTHER PUBLICATIONS

European Search Report dated Aug. 02, 1996.

*Primary Examiner*—M. D. Patterson
*Attorney, Agent, or Firm*—Joseph M. Noto; Louis A. Morris

[57] ABSTRACT

The invention relates to a waterproof shoe with a laminate positioned against the inner side of the outer layer, which includes at least one waterproof, water-vapour permeable interlining and a lining, where: the lower area of the laminate is essentially parallel to the underside of the outsole; the upper surface of the lower area of the laminate facing into the inner area of the shoe forms a continuous surface with the upper side of the outsole facing into the inner area of the shoe and is essentially parallel to the underside of the outsole; the lower area of the outer layer is joined to the laminate exclusively via the outsole; provisions for shaping are fitted in the toe and shank areas of the outsole.

11 Claims, 5 Drawing Sheets

SHOE WITH LAMINATE EMBEDDED IN SPRAY-MOULDED COMPOUND SOLE

CROSS REFERENCE TO RELATED APPLICATIONS

This application claims the benefit of the filing date of prior German Application Nos. 195 07 210.3 filed Mar. 2, 1995 and 195 13 412.5 filed Apr. 8, 1995, which are incorporated herein by reference in their entirety.

BACKGROUND OF THE INVENTION

1. Field of the Invention

The invention relates to a waterproof shoe with an upper including at least one outer layer and a laminate positioned against the inner side of the outer layer, which includes at least one waterproof, water-vapour permeable interlining and a lining, and with an outsole, where at least part of the lower area of the outer layer is essentially perpendicular to the underside of the outsole.

2. Description of the Related Art

Shoes can be made waterproof and water-vapour permeable by adding a membrane to the inner side of the textile or leathery outer layer of the upper, for example a microporous or homogenous membrane which is impermeable to water, but permeable to moisture caused by the wearer's foot perspiring in the inner area of the shoe. DE-OS 38 21 602 describes a shoe of this kind with an upper consisting of an outer layer and a lining, a waterproof, water-vapour permeable, micro-porous functional layer and a waterproof synthetic sole which is spray-moulded onto the lower area of the shoe upper. The lower area of the outer layer is formed from a porous material, e.g., a spacing material, which can be penetrated by the synthetic spray-moulded material of the sole, and which is sewn to the lining and the functional layer.

According to this publication, during the process of spray moulding to the shoe upper the liquid material of the synthetic sole can penetrate the lower porous area of the outer layer, reaching through to the functional layer or the functional layer with integrated laminate. The intention here is for the spray-moulded synthetic sole material to seal the holes in the stitched connecting seam between an insole, the functional layer and the outer layer. It has been found, however, that although the liquid material of the synthetic sole is able to penetrate the pores of the lower porous area of the shoe upper and the spacing material, protection against water seeping through the material of the shoe upper is not improved, since the high mechanical stress exerted on the shoe as the foot rolls forwards can, over a long period of time, cause the porous wall to tear, or at least cause the synthetic sole material to tear away from the pores of the spacing material, whereby, understandably, the strain is increased on the connections between the synthetic sole material and the spacer material which are still intact. It has been shown that in this situation, water which has soaked downwards in the outer layer can seep through cracks and tears in the porous spacer material and in the porous material of the outer layer of the shoe upper caused by tearing or tearing away from the synthetic sole material, can soak longitudinally into the area between the spacer material and the functional layer and finally enter the inner area of the shoe via the seams through the functional layer, which are subject to the same mechanical stress and its consequences as described above.

The ability of water to seep is underestimated in the prior art, since it has repeatedly been found that water is able to find its way into the inner area of the shoe, its movement particularly assisted by capillary action and also the so-called wicking effect of the seams, or rather the seam threads passing through the seam holes that penetrate the different layers and act as an ideal passage for water.

It has also been ascertained, particularly in a conventional shoe which is porous in the lower area of the shaft material, that the lateral stability of the shoe is limited to such an extent that the wearer's shoe slips inwards or outwards as the foot rolls forwards, providing insufficient walking support.

It has also been observed that in the prior art, a large number of pores is required in the lower area of the shoe upper and in the spacer material, although the likelihood of the material tearing away or tearing naturally increases with the number of pores. Also, from a statistical point of view, the probability of the porous wall tearing increases proportionally with the number of pores per defined surface. In addition to this, the more the structure of the shaft material is disturbed by perforation in it, the less stress the shaft material is able to withstand, a condition which should certainly be avoided, otherwise the user may suffer orthopaedic damage on regular use of the shoe.

The conventional design of shoes also has disadvantages as far as production technique is concerned, since a great many production stages are necessary which involve extremely accurate manual work and therefore increase costs. This particularly concerns production stages such as laying the spacer material accurately over the lower area of the shaft material, which is folded under, and exact alignment of the bonding material or spacer material at a sufficient distance from the edge of the outsole, which make mass production of this kind of shoe awkward, time-consuming and work-intensive. The porous bonding material must also be laid against the lower area of the shaft without any folds forming, that is, it must be laid in such a way that it also lies flat in the curved areas, in particular the heel and toe areas.

SUMMARY OF THE INVENTION

An aspect of the invention is therefore to solve these problems and dispense with the disadvantages encountered in the prior art. The intention is to make available a shoe which can be manufactured simply and economically and which guarantees excellent walking support as the foot rolls forwards and waterproofing which lasts for a sufficient length of time.

The shoe should also provide the orthopaedic qualities required in a shoe, such as an anatomically moulded footbed, due to the rapidly increasing health consciousness among consumers, which also extends to an interest in orthopaedically-designed shoes. When a shoe is designed in this way, it is desirable for the symptoms of a fallen arch and loss of the vertical, static hold of the foot caused by overstraining of the ligaments and muscles at least to be lessened in the wearer.

The solution to these problems is a shoe with embedded laminate in accordance with the independent and dependent claims. The subordinate claims relate to preferential embodiments of the subject of the invention.

DETAILED DESCRIPTION OF PREFERRED EMBODIMENTS

The subject of the invention is therefore a waterproof shoe with embedded laminate, with an upper comprising at least one outer layer and a laminate positioned against the inner side of the outer layer, which includes at least one waterproof, water-vapour permeable interlining and a lining, and with an outsole, where at least part of the lower area of the outer layer is essentially perpendicular to the underside of the outsole, the shoe being characterised as follows: the lower area 2' of the laminate 2 is essentially parallel with the underside of the outsole 7; the upper surface of the lower area 2' of the laminate 2 facing into the inner area of the shoe forms a continuous surface 8 with the upper side of the outsole 7 facing into the inner area of the shoe and is essentially parallel with the underside of the outsole 7; the interlining of the laminate 2 is bonded to the outsole 7 in a waterproof manner in the lower area 2' of the laminate 2, which is essentially parallel with the underside of the outsole 7, and at the extreme edge of the laminate 2; and the lower area 1' of the outer layer 1 is joined to the laminate 2 exclusively via the outsole 7.

In production of this type of shoe, the shoe upper consisting of the outer layer 1 and the laminate 2 is laid on the last. Here the laminate 2 is adjacent to the side of the outer layer 1 facing into the inner area of the shoe, that is the inner side. The lower area 2' of the laminate 2 is laid over the last. In one embodiment, the laminate 2 can be bonded to the outer layer 1 using a conventional adhesive, which should preferably be water-vapour permeable. The outsole 7 is now spray-moulded onto the last under high pressure such that the upper surface of the lower area 2' of the laminate 2 facing the last forms a continuous surface with the upper surface of the spray-moulded outsole facing the last.

This type of shoe can also be manufactured by a method in which the lower area 2' of the laminate 2 is bonded to a flat textile structure 11 or an insole. The joint is made in such a manner that the lower area 2' of the laminate 2 and the outer edges of the flat textile structure 11 or the insole are distanced from one another, so that when the outsole is spray-moulded onto the shaft, the sole material can enter the space between the lower area 2' of the laminate 2 and the outer edges of the flat textile structure 11 or the insole. In this way the sole material forms a continuous surface with the lower area 2' of the laminate 2, which is continued towards the centre of the shoe by the flat textile structure 11 or insole.

A continuous surface is one which has no bumps, lumps, indentations or dints at the transitional area 8 between the surface of the laminate 2 and the surface of the outsole 7 which could cause uncomfortable pressure points during use by the wearer of the shoe of the invention. In other words, the transitional area 8 is a smooth surface. When this method is used no insole needs to be fitted, which consequently lowers the production costs of the shoe of the invention compared to the production costs of a shoe produced according to the prior art, since a whole production stage can be omitted, i.e., insertion of the insole, and because a saving is made on materials.

In one preferred embodiment, the lower area 2' of the interlining of the laminate 2 can be arranged so that it is essentially parallel with the underside of the outsole while the upper surface of the lower area 2' of the laminate 2 facing into the inner area of the shoe forms a continuous surface with the upper side of the outsole 7 facing into the inner area of the shoe which is essentially parallel with the underside of the outsole. This embodiment provides a shoe upper with very good lateral stability which therefore gives sufficient walking support. This is also due to the synthetic sole, which is subsequently hot spray-moulded onto the shaft and thoroughly bonded to the interlining.

The waterproof shoe of the invention has an upper consisting of an outer layer 1 and a laminate 2 adjacent to the inner side of the outer layer 1, which consists of at least one waterproof, water vapour permeable interlining and a lining. The shoe also has a spray-moulded outsole 7, whereby at least part of the lower area of the outer layer 1 is essentially perpendicular to the underside of the outsole 7. One preferred embodiment is such that: the lower area 2' of the laminate 2 is essentially parallel with the underside of the outsole 7; the lower area 2' of the laminate 2 is surrounded on both sides by the synthetic sole material of the outsole 7; the upper surface of the outsole 7 facing into the inner area of the shoe forms a continuous surface 7', where the lower area 1' of the outer layer 1 is joined to the laminate 2 exclusively via the outsole 7. When this method is used no insole is required.

The expression "on both sides" is understood here to mean that the synthetic sole material is adjacent both to the side of the laminate 2 facing the underside of the outsole 7 and to the side of the laminate 2 facing away from the underside of the outsole 7.

Furthermore, with the shoe of the invention, it is possible to form a footbed in line with orthopaedic requirements in a simple way, by using an appropriately shaped last surface during the stage in which the spray-moulded outsole 7 is moulded onto the shoe upper.

Unlike shoes manufactured in line with the prior art, there is no danger with the shoe of the invention of tears or cracks appearing in the lower area of the shaft material, which can easily occur in other cases due to the insufficient inner stability of the shaft material which is caused by its high porosity.

The lower area of the lining can also be arranged so that it is essentially perpendicular to the underside of the outsole 7, which means that the entire surface facing the inner area of the shoe can be covered and cushioned with an insole, increasing the wearing comfort of the shoe of the invention and allowing the wearer to use insulating insoles if necessary.

It has also proved advantageous that the gluing or bonding between the lower area 2', in particular the extreme edge of the laminate 2, and the synthetic sole material is in itself such a good seal that should water actually soak downwards in the outer layer, there is no means by which it can enter the inner area of the shoe. This is because unlike in the conventional shoes mentioned previously, there are none of the usual seams which act as ideal channels through which water can travel, allowing the water in the lower area of the outer layer to seep straight into the inner area of the shoe, as a result of the wicking effect of the seams or threads.

The shoe of the invention has proved superior, since the manufacturing stage in which the shaft material is pulled over the last, the laminate 2 turned back and the synthetic sole material spray-moulded onto the shaft allows economical production of the shoe of the invention while providing excellent wearing comfort. Also, a shoe can now be mass produced which is sufficiently waterproof, provides satisfactory lateral stability, due to the omission of porous shaft material, and can even include an orthopaedic footbed to fit the longitudinal and lateral contours of the wearer's foot.

Also advantageous is the surface treatment on the outer layer 1 facing away from the inner area of the shoe, that is, the outer side. This surface is treated at least in the area which is covered when the synthetic material of the sole is spray-moulded onto the shaft or when the synthetic sole 7 is glued on. The synthetic sole material which is injected onto this area is also known as the sealing lip. Treatment of the upper surface may, for example, involve mechanical or chemical roughening or scouring of the leather or leather-like or textile layer used as outer layer 1. Not only does this improve the bonding or adhesion of the outer layer 1 to the sole 7, it also increases the water resistance of the bond between the outer layer 1 and the sole 2, since the number of flawed areas which remain unglued is reduced.

In order to simplify the manufacturing method of the shoe of the invention and to ensure that the shoe fits exactly to the surface of the last, it is possible for the shoe of the invention to have a spray-moulded outsole 7, where the outer layer 1 includes means in its lower area 1' which are used for shaping the lower area of the outer layer 1 in the region of the outsole 7. These means are joined to the outer layer 1.

Preferably, the means used for shaping are integrated in the toe area or in a section of the toe area, that is, the front area. Additionally or alternatively the means used for shaping may be formed in the shank area of the shoe of the invention.

The toe area is the area extending from the toe of the shoe to the point at which the end of the heel reinforcement which points towards the toe of the wearer is located. This point is usually described as the shank area of the shoe.

The shank area is the area which is adjacent to the toe area and at which the end of the heel reinforcement which points towards the toe of the wearer is located. The shank area is mainly the area of the cuneiform and navicular bones.

It is particularly advantageous if the means used for shaping are of the nature of an extension 13. Here, the extension 13 can be the lower area 1' of the outer layer 1 which is turned back towards the inner area of the shoe. It is possible to turn back the extension 13 either towards the inner area of the shoe or towards the outer area of the shoe. In the event of the extension 13 being turned back towards the inner area of the shoe, the extension 13 must be cut into at least once, preferably so that the cut is essentially perpendicular to the underside of the outsole 7. It should be noted here that if the extension 13 is flattened onto the side of the lower area of the outer layer 1 facing into the inner area of the shoe, the surfaces of the extension 13 overlap on either side of the cut, which should preferably be located at the front tip. Since overlapping of the surfaces in this way can cause pressure points (clavus) on the foot of the wearer, which may lead to painful thickening of the horny layer of the epidermis (hyperkeratosis), the overlapping surfaces are cut so that the edges of the cut 14 lie flush against each other, with an angular or square-edged joint. The edges should preferably be turned back to the outside and sewn together. It is important here, when the extension is turned back, for the side facing into the inner area of the shoe to lie as flat as possible. The parts which are turned back to the outside and sewn together provide the necessary support for shaping and are embedded in the sole material in the completed shoe.

The lower area of the outer layer is defined as the area of the outer layer 1 which extends from the area of the outer layer covered by the synthetic sole material and acting as a sealing lip, in the opposite direction to the upper shaft end which faces the wearer.

It is also possible to make more than one cutout in the embodiments of the shoe of the invention mentioned above and illustrated below. The cut 14 should preferably be located at the front tip of the shoe, but the cut or cuts may also be located in the side area of the shoe which is adjacent to the front area.

The front tip is defined as the area of the toe area which is the foremost part of the toe area of the shoe.

The extension 13 can be permanently joined to the lower area of the outer layer 1, e.g., glued or sewn on. It also increases the sturdiness of the shoe of the invention if the abutting edges of the extension 13 in the area of the cut 14 are sewn together.

If the extension 13 is turned back towards the outer area of the shoe, the cut made in the extension 13 should preferably be essentially perpendicular to the underside of the outsole 7. By this method, the extension 13 which lies flat against the side of the outer layer 1 facing away from the inner area of the shoe can also be glued to the same. The opened-out edges of the cut 14 can also be joined together with a textile joint, e.g., sewn together.

It is preferable that the extension be located at the front area of the shoe of the invention.

The front area is defined as the area of the toe area which is adjacent to the front tip on both sides and which forms the essentially curved area of the toe area, which is adjacent to the toes of the wearer's foot.

A flat textile structure 15 in the shank area, which is permeated by the synthetic material of outsole 7, is particularly suitable as the means used for shaping the shoe of the invention. The flat textile structure 15, e.g., nonwoven, felt, knitted fabric, woven fabric, warp-knitted fabric, etc., should ideally be joined, for example sewn, to the lower area 1' of the outer layer 1, which should preferably be perpendicular or parallel to the underside of the outsole 7. In this embodiment it is obvious that it is precisely this special fixing of the outer layer 1 (which itself in turn contributes to the shape and design of the shoe) in the shank area, using the means for shaping, which gives positive results: the incorrect hold of the user's foot and symptoms of a fallen arch are corrected by the upper side of the outsole, which is shaped to form a footbed, and the loss of the vertical, static hold of the foot is at least minimised.

The means used for shaping in the shank area can also be designed as a guide loop 5 for encasing a drawstring 6 in the guide loop. A guide loop 5 may, for example, be a seam in the lower area 1' of the outer layer 1 or a casing sewn onto the lower area 1' of the outer layer 1. The preferred method is for the lower area 1' of the outer layer 1 which reaches across the shank area to be turned back or folded towards the inner area of the shoe or the outer area of the shoe, forming a guide loop 5 which encases a drawstring 6, and glued or sewn to the adjacent outer layer. In production of the shoe of the invention, the shaft material, consisting of the outer layer 1, laminate 2 and the guide loop, is pulled over the last, which is covered with a separating layer. Then the drawstring 6 is drawn through the guide loop and both ends of the drawstring tied in a knot in such a way that when the liquid synthetic sole material is spray-moulded onto the shoe upper, the knot in the shank area is embedded in the same, so that the knot is covered on all sides and the wearing comfort of the shoe is not affected.

When insoles are used in conventional shoes, a heavy lateral strain has been found to be exerted on the outer layer by the insoles as the foot rolls forwards, and the outer layer or shaft material to drift out laterally, perpendicular to the longitudinal axis of the sole, due to localised overstraining of the outer layer or shaft material. It has, however, been found that these aforementioned symptoms are prevented, or at least delayed to a sufficient extent, in the shoe of the invention, due to the upper side of the outsole 7 contoured to form a footbed and/or due to the means used for shaping, particularly when they are located in the shank area.

The upper side of the outsole is defined as the side of the outsole 7 facing into the inner area of the shoe, that is, the inside of the shoe.

A means used for shaping which are, for example, designed as a guide loop 5 for encasing a drawstring 6 in the guide loop is a great advantage. A guide loop 5 can, for example, be a seam or a casing which is sewn on. The preferred method is for the lower area 1' of the outer layer 1 to be turned back or folded towards the inner area of the shoe or the outer area of the shoe and to be sewn or glued to the adjacent outer layer.

In production of the shoe of the invention, the shoe upper is pulled onto the last and, using the drawstring 6, for example, which runs through the guide loop 5, is then pulled in around the last in such a manner that the shaft fits exactly onto the upper surface of the last. Once a separating agent has been applied to any areas of the last surface which are still exposed, the liquid synthetic sole material is spray-moulded onto the last from below. During this process, the upper surface of the outsole 7 facing into the inner area of the shoe can be contoured to a considerable extent, that is, the outsole 7 can be fitted closely to the surface of the last. The result is a waterproof shoe of the invention with a footbed contoured sufficiently for orthopaedic purposes and manufactured in just a few production stages.

A flat textile structure 9 or 11, which is permeated by the synthetic material of the outsole 7, has proved even more suitable as a means used for shaping. The flat textile structure can be made of nonwoven, felt, knitted fabric, woven fabric, warp-knitted fabric, etc. Furthermore, this embodiment is useful, since the walking stability and lateral stability it provides give the shoe of the invention a balanced sturdiness, which in turn guarantees an excellent rolling motion of the foot. Also, since porous shaft materials are used without any alteration to their inner structure, great stability is provided, especially in the case of sudden and high-impact stress which is exerted in particular on sports shoes.

This already adequate lateral stability can be increased still further if the lower area of the outer layer 1 is sewn to the flat textile structure 9, preferably in the toe area of the outsole 7. Most notably in shoes which are subjected to high stress, in particular in the lateral foot supports, such as climbing boots, hiking boots and sports shoes, the lateral stability can be increased by attaching the lower area 2' of the laminate 2, which is parallel with the underside of the outsole 7, to a separate flat textile structure 11, e.g., by sewing them together. It has also been found that the lateral stability of this embodiment of the shoe of the invention increases considerably with the improved adhesion of the outsole 7 which is glued or spray-moulded onto the sides and, for example, the addition of heel caps 3. As a result, the shoe of the invention can be of assistance in providing support against the bending of the heel bone to one side which is symptomatic of "pes valgoplanus", results from the inner longitudinal arch dropping, and is accompanied by the wearer's foot slipping to one side at every step, either toward the outside or the inside, depending on the deformity.

It has, however, been found sufficient here for the flat textile structure 9 or 11 to be joined tightly only in the lower area of the laminate in the toe area.

The lateral stability of shoes which are subjected to high stress can also be increased by adding rear caps 3 or side caps which can be glued and/or sewn onto the outside of the outer layer 1 or can be glued and/or sewn between the outer layer 1 and the laminate 2.

The production of conventional shoes requires time and work-intensive stages, such as placing, aligning and smoothing the spacing material free of folds onto the turned-back area of the shaft material, especially in the critical areas such as at the toe and in the heel area, perforation of the shaft material, etc., which increase the production costs of conventional shoes significantly. These stages are eliminated in production of the shoe of the invention because the spray-moulding or gluing on of the synthetic sole is not carried out until after the shaft material has been pulled onto the last and the lower area of the laminate positioned in a simple process. The mass production methods used in the production of conventional shoes have the drawback that the spacing material may be placed with folds in it; bonding faults may then occur in the gluing zone, with the result that conventional shoes may be insufficiently waterproof. This disadvantage is eliminated in the shoe of the invention.

Since the shoe of the invention includes a laminate 2 which has a waterproof but water vapour permeable interlining, the shoe of the invention is also distinguished by excellent wearing comfort, since any dampness caused by perspiration of the feet is immediately transported out of the inner area of the shoe. This interlining may be a supportive layer, e.g., a flat textile structure such as nonwoven, felt, knitted fabric, woven fabric or warp-knitted fabric, which should preferably be coated or impregnated with the waterproof and water-vapour permeable material. As well as one or more supportive layers, the interlining may also include a membrane made of the waterproof and water-vapour permeable material.

To manufacture the waterproof and water-vapour permeable material, polymers can be used which are suitable for forming a micro-porous polymeric matrix. These include polyolefines, such as polyethylene-propylene copolymers, polyethylene, terephthalates, polycaprolactam, polyvinylidenefluoride, polybutyleneterephthalate, polyester copolymers and polytetrafluoroethylene. The waterproof and water-vapour permeable material may be a coating or impregnation or a membrane with polymers on a copolyether ester base, or may be made of oriented polytetrafluoroethylene, preferably with a micro-porous polyurethane coating (Gore-tex). Polymers on a copolyether ester base (Sympatex) have proved to be excellent materials for this purpose due to their properties of high water-vapour permeability and high waterproofness and wear resistance. Polymers on a copolyether ester base (Sympatex) are preferred as the waterproof and water-vapour permeable material. The copolyether esters may consist of a large number of recurring intralinear long-chain and short-chain ester units, which are linked statistically head to tail through ester bonds, where the long-chain ester units correspond to the formul and the short-chain ester units correspond to the formula where G represents a divalent rest remaining after the terminal hydroxyl groups are removed from at least one long-chain glycol with a medium molecular weight of 600 to 6000 and an atomic carbon-to-oxygen ratio of between 2.0 and 4.3, where at least 20 percent by weight of the long-chain glycol has an atomic carbon-to-oxygen ratio of 2.0 to 2.4 and forms 15 to 50 percent by weight of the copolyether ester, R represents a divalent rest remaining after the removal of carboxyl groups from at least one dicarboxylic acid having a molecular weight of less than 300, and D represents a divalent rest remaining after the removal of the hydroxyl groups from at least one diol having a molecular weight of less than 250, where at least 80 mole percent of the dicarboxylic acid used consists of terephthalic acid or its ester-forming equivalents and at least 80 mole percent of the diol with a low molecular weight consists of 1,4-butanediol or its ester-forming equivalents, the sum of the mole percents of the dicarboxylic acid other than terephthalic acid or its ester-forming equivalents and the diol with a low molecular weight other than 1,4-butanediol or its ester-forming equivalents is no more than 20 percent, and the short-chain ester units form 40-80 percent by weight of the copolyether ester. Ideally, the polymers can be entirely or partly copolyether esters in which at least 70 mole percent of the dicarboxylic acid used is 2,6-naphthalene dicarboxylic acid or its ester-forming equivalents, and in which at least 70 mole percent of the diol with a low molecular weight used is 1,4-butanediol or its ester-forming equivalents, and the sum of the mole percents of the dicarboxylic acid other than 2,6-naphthalene dicarboxylic acid or its ester-forming equivalents and of the diol with a low molecular weight other than 1,4-butanediol or its ester-forming equivalents is no more than 30 percent, and the ester units with short chains form 35 to 80 percent by weight of the copolyether ester. Most especially suited are polymers wich are copolyether esters consisting of a large number of recurring intralinear long-chain and short-chain ester units, which are linked statistically head to tail by ester bonds, where the long-chain ester units correspond to the formula and the short-chain ester units correspond to the formula where G represents a divalent rest remaining after terminal hydroxyl groups are removed from at least one long-chain glycol with a medium molecular weight of 600 to 4000 and an atomic carbon-to-oxygen ratio of between 2 and 4.3, where at least 20 percent by weight of the long-chain glycol has an atomic carbon-to-oxygen ratio of 2.0 to 2.4 and forms 15 to 50 percent by weight of the copolyether ester, R represents a divalent rest remaining after the removal of the carboxyl groups from at least one dicarboxylic acid with a molecular weight of less than 300, and D represents a divalent rest remaining after the removal of hydroxyl groups from at least one diol having a molecular weight of less than 250, where at least 70 mole percent of the dicarboxylic acid used consists of 2,6-naphthalene dicarboxylic acid or its ester-forming equivalents and at least 70 mole percent of the diol with a low molecular weight consists of 1,4-butanediol or its ester-forming equivalents, and the sum of the mole percents of the dicarboxylic acid other than 2,6-naphthalene dicarboxylic acid or its ester-forming equivalents and the diol with a low molecular weight other than 1,4-butanediol or its ester-forming equivalents is no more than 30 percent, and the short-chain ester units make up 35-80 percent by weight of the copolyether ester.

The copolyether-ester polymer membranes used in a further embodiment can vary in thickness between 10 and 15 μm and are distinguished by their high permeability to water vapour of more than 2700 g/m² (in 24 hours, according to ASTM E 96 66, method B, modified).

The lining may be made of either: terry fabric; goatskin, sheepskin, cowhide or pigskin; velvet fabric; camel-hair fabric; knitted or woven fleece; woven fabric, ideally of cotton, new wool, synthetic fibres and/or regenerated and/or modified cellulose.

The outer layer 1 may represent at least one of the group which includes a leather layer, a textile layer, a textile-like layer and woven fabric. The outer layer may be canvas, fabric, chintz, everglaze, terry, velvet, Genua corduroy, corduroy, velveteen, Norzon, leatherette, moleskin, duvetine, knitted or woven fabric, satin, fur, imitation fur, suede leather, satin-finished leather, patent leather or polished, embossed, shrunk or grained leather.

Hydrophilic adhesives are suitable for gluing the outer layer 1 to the laminate 2, since they do not hinder the movement of water vapour, as are hydrophilic foamed adhesives on a polyurethane or acrylic base. Hot-melt adhesives can also be used for gluing.

Waterproof materials such as rubber, polyurethane, polyvinyl chloride and their derivatives and mixtures of the same are suitable materials for the synthetic sole.

In one ideal embodiment it has been found that a layer of heat-insulating material can be applied, for example between the interlining and the outer layer 1, which is porous and therefore permeable to water vapour and air.

The above-mentioned disadvantages of shoes in the prior art, such as limited flexibility, insufficient rolling characteristics, high manufacturing costs and time-consuming manufacturing processes, have therefore been at least greatly reduced by the shoe of the invention, in a balanced manner and when least expected by those skilled in the art.

BRIEF DESCRIPTION OF THE DRAWINGS

Further details, aspects and advantages of this invention are explained in the following description, with reference to the illustrations. The subject matter is greatly simplified in the illustrations, due to enlargement and the diagrammatic nature of the drawings, which are not drawn to scale. The illustrations are as follows:

In FIG. 1 the shoe of the invention consists of a wool lining and an outer layer 1 of grained cowhide. The laminate 2 in all the examples is a woven fabric with a polyester support layer and a waterproof and water-vapour permeable membrane, which contains copolyether esters with a large number of recurring intralinear long-chain and short-chain ester units, which are linked statistically head to tail through ester bonds (Sympatex).

Figure 1:
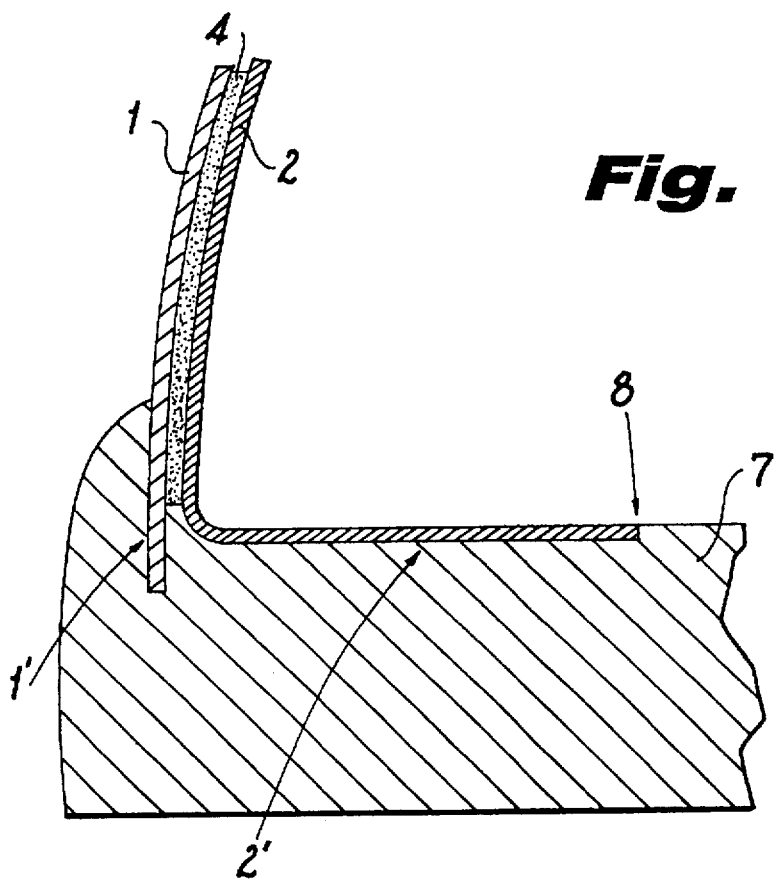
FIG. 1 is a cross-section through a shoe of the invention with a spray-moulded outsole and an outer layer glued to a laminate.

The outer layer 1 is glued to the laminate 2 above the lower area 1' of the outer layer 1, preferably with a water-vapour permeable glue 4. After the shoe upper has been pulled over the last with the outer layer 1 and the laminate 2 and a separating agent has been applied to any areas of the last surface which are still exposed, the polyurethane synthetic sole material is spray-moulded onto the last under pressure and heat in such a way that an intensive bond is effected between the outsole 7 with the lower area 1' of the outer layer 1, forming a sealing lip in the process, and the side of the lower area 2' of the laminate 2 facing the underside of the outsole 7 (=underside). In this way the transitional area 8 between the lower area 2' of the laminate 2 and the upper surface of the outsole 7 facing into the inner area of the shoe forms a continuous surface.

Figure 2:
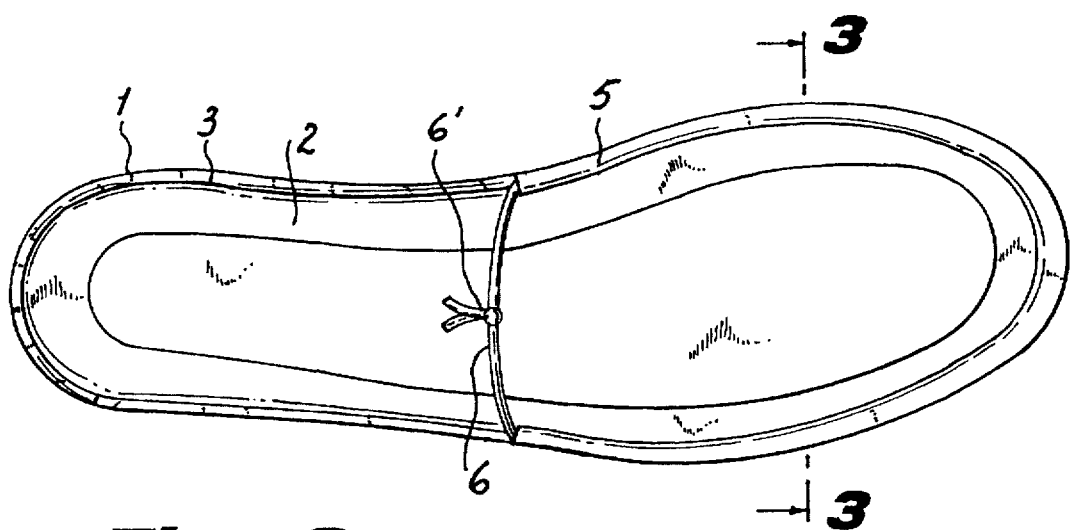
FIG. 2 is a view from below of the shoe of the invention with a guide loop, shown without outsole.
Figure 3:
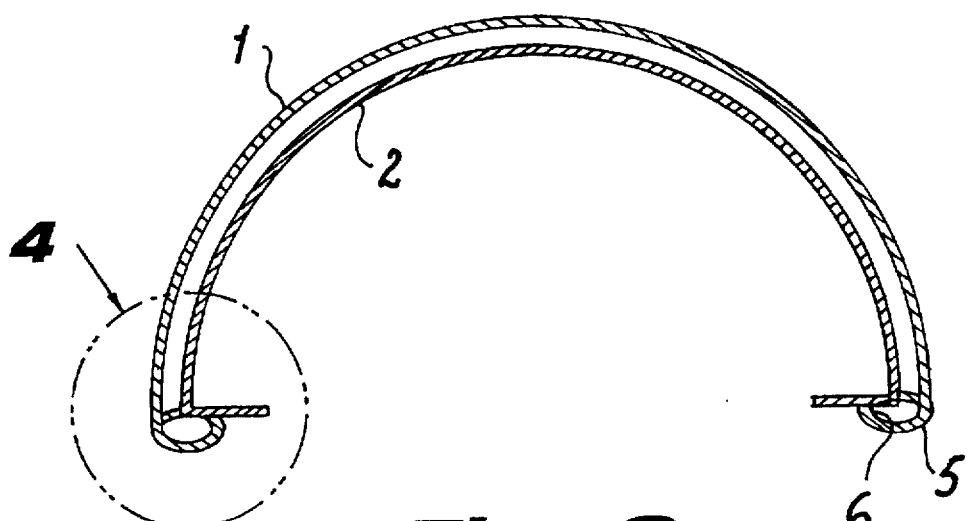
FIG. 3 is a view of the cross section A—A shown in FIG. 2 in the toe area of the shoe of the invention.
Figure 4:
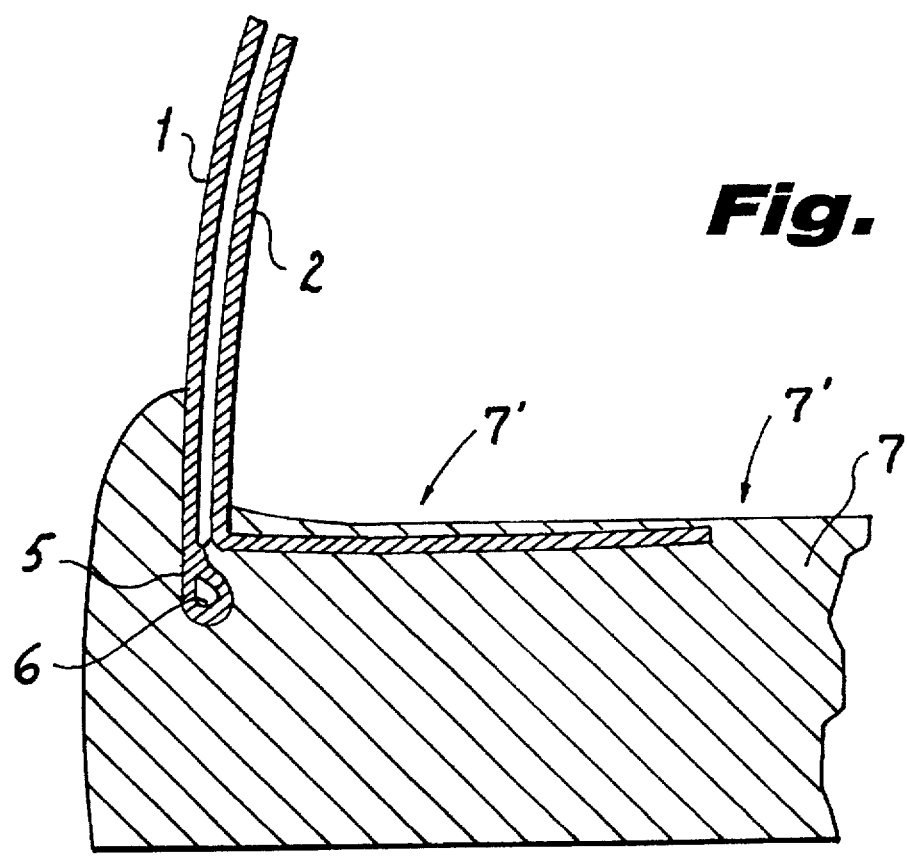
FIG. 4 is an enlargement of the lower area X of the shoe of the invention shown in FIG. 3 with spray-moulded outsole and guide loop.

In FIGS. 2 to 4, the lower area of the outer layer 1 is turned back into the inner area of the shoe to form a guide loop 5 for encasing a drawstring 6. A rear cap 3 is inserted between the outer layer 1 and the laminate 2 in the rounded heel area, for additional reinforcement in the area of the rear cap in the shoe of the invention. Next the shoe upper is pulled over the last with the laminate 2, which is not glued to the outer layer 1, at least not in the lower area of the shoe, which means that a conventional gluing stage is omitted. Then the drawstring 6 is tightened and its ends 6' knotted into a permanent knot and covered by the spray-moulded material in such a manner that a layer 7' of synthetic sole material covers both the underside and the side of the lower area 2' of the laminate 2 facing into the inner area of the shoe (=inner side). Since the laminate 2 has the lining on its side facing into the inner side of the shoe, no intensive bonding is effected between the lining and the layer 7' of synthetic sole material, but this joint is quite sufficient to form a stable walking surface for the wearer's foot. The waterproofness of the inner area of the shoe is already guaranteed by the thorough waterproof gluing of the underside and edge area of the lower area 2' of the laminate 2 to the synthetic sole material.

The edge area is defined as the area of the lower area 2' of the laminate 2 facing the longitudinal axis of the sole.

Figure 5:
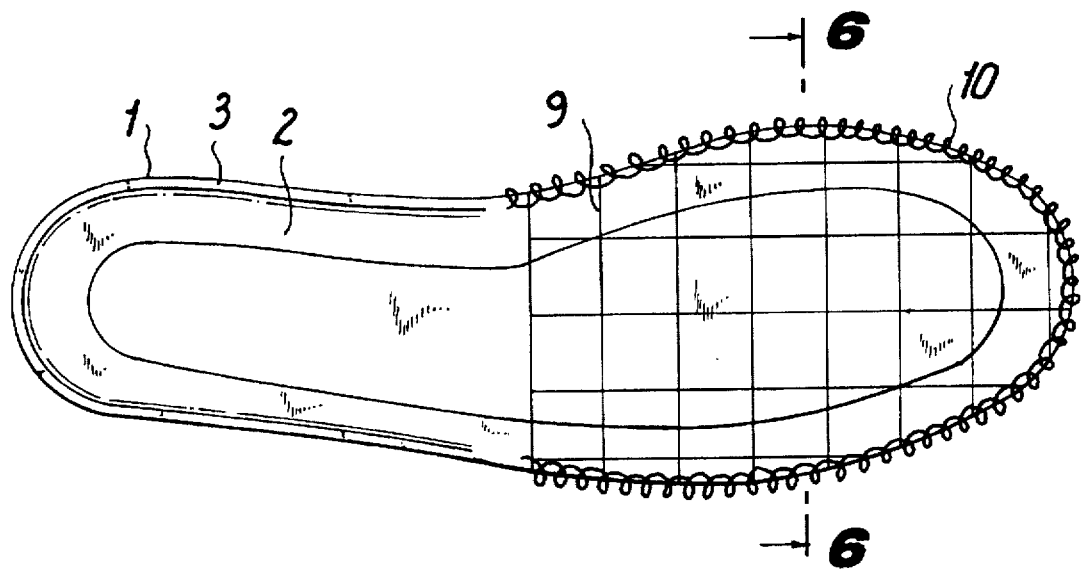
FIG. 5 is a view from below of the shoe of the invention with flat textile structure on outer layer, shown without outsole.
Figure 6:
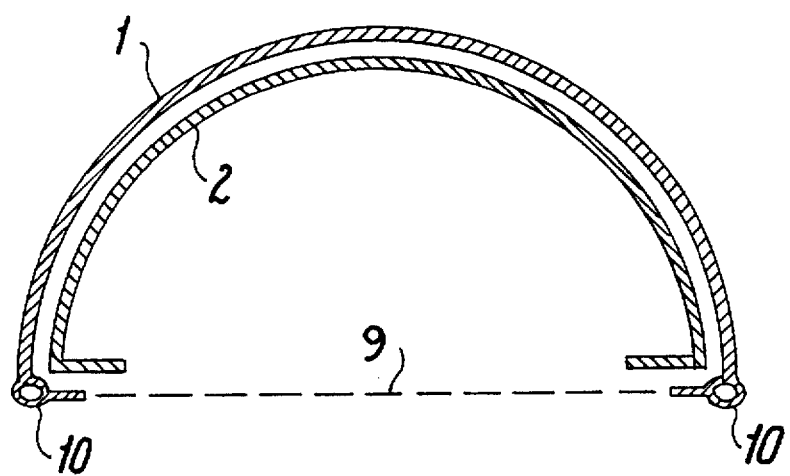
FIG. 6 is a view of the cross-section B—B shown in FIG. 5 in the toe area of the shoe of the invention.
Figure 7:
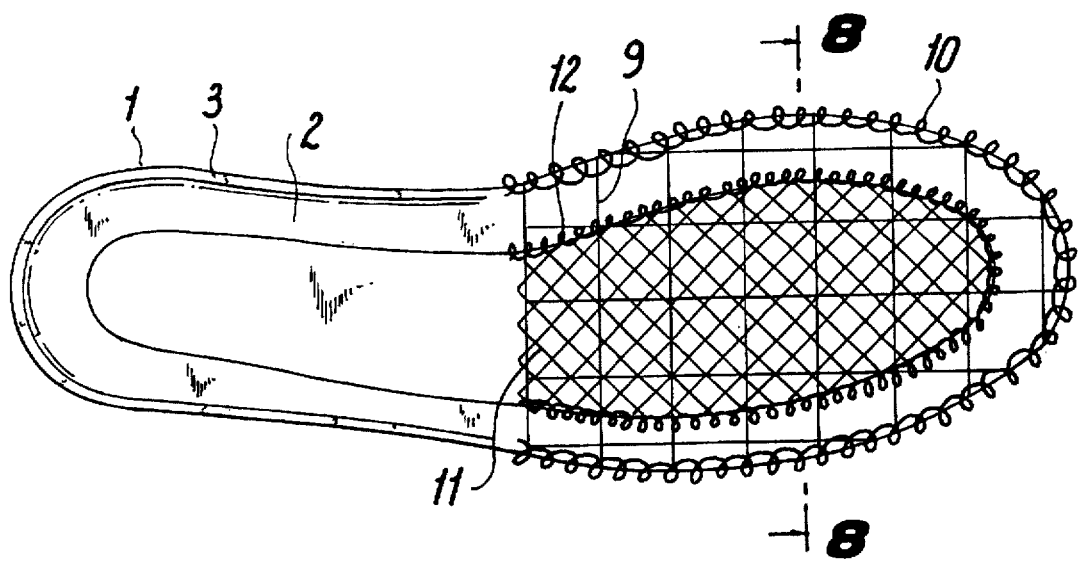
FIG. 7 is a view from below of the shoe of the invention with flat textile structure on the outer layer and laminate, shown without outsole.
Figure 8:
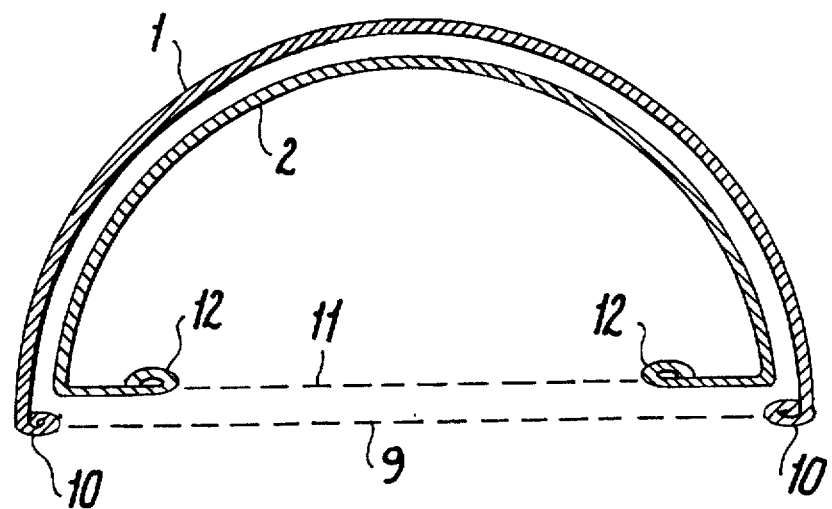
FIG. 8 is a view of the cross-section C—C shown in FIG. 7 in the toe area of the shoe of the invention.

In FIGS. 5 and 6 a flat textile structure 9 in the toe area, in this case a woven polyester fabric, lies against the edge of the lower area of the outer layer 1 facing into the inner area of the shoe, and is joined to the outer layer 1 with a seam 10. To increase the lateral stability even further, a second flat textile structure 11, in this case a woven polyester fabric, is sewn onto the edge area of the lower area 2' of the laminate 2 with a seam 12. A flat textile structure 11 of this kind, which is joined to the lower area 2' of the laminate 2, can also be employed in the embodiments illustrated in FIGS. 1 to 4.

When the liquid synthetic sole material is spray-moulded onto the upper, the synthetic sole material penetrates the fabric, forms an upper surface moulded exactly to the surface of the last and also adheres to the fabric intensively. Rear caps 3 made of thin but dimensionally stable and elastic leather are sewn in between the outer layer 1 and the laminate 2, to increase the lateral stability of the waterproof shoe as the foot rolls forwards.

It has been found that in the embodiments described above, the inner area of the shoe is sufficiently protected against penetration by water, even when rolling motion of the shoe takes place in wet surroundings, especially when polymers on a copolyether ester base (Sympatex) are used as the waterproof and water-vapour permeable material.

It has also been found that the wearer experiences a pleasant and unrestricted feeling of comfort during use, due to the flat textile structure 9 (FIGS. 5 and 6), which is attached at least to the outer layer 1, in combination with the upper side of the outsole 7 and the lower area 2' of the laminate 2, which are contoured as a footbed.

Figure 9:
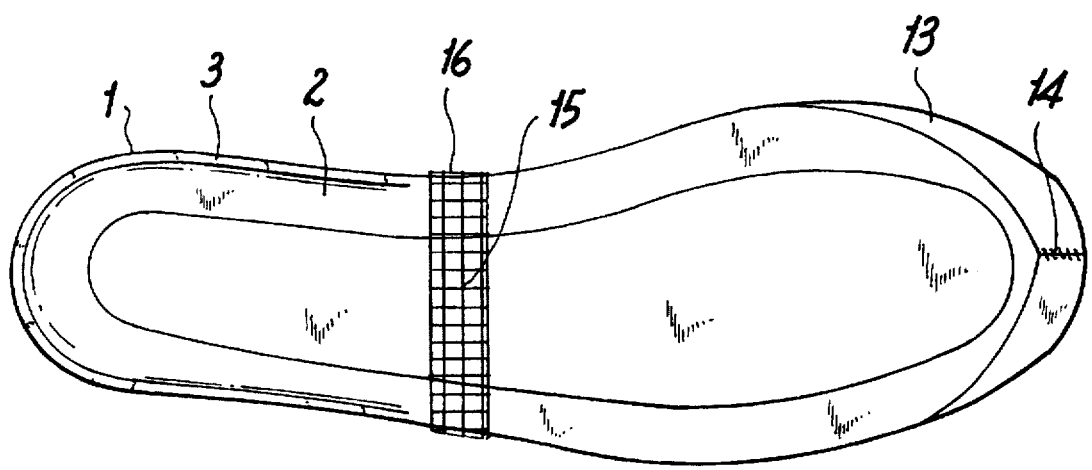
FIG. 9 is a view from below of the shoe of the invention with flat textile structure on the outer layer in the shank area, shown without outsole.

In a further example (FIG. 9), the lower area 1' of the leather layer used as outer layer 1, which is essentially perpendicular to the underside of the outsole 7, is securely attached to a woven polyester fabric 15 used as the flat textile structure in the shank area with seams 16. When the liquid synthetic sole material is spray-moulded onto the shoe upper, it penetrates the woven polyester fabric, forming a durable, tear- and waterproof joint between the leather layer used as outer layer 1 and the laminate 2, so that the inner area of the shoe is hermetically sealed and water cannot enter. The lower area 1' of the leather layer used as outer layer 1 is turned back towards the inner area of the shoe in the front area, to stabilise the shoe upper of the shoe of the invention, and glued flat to the side of the lower area of the leather layer facing into the inner area of the shoe. The edges of the cut 14 located at the front tip are turned back to the outside and sewn together.

In all the embodiments illustrated, the shoe of the invention has proved to be sufficiently waterproof and excellently suited for allowing moisture from the feet to diffuse away from the inner area of the shoe to the outside. As a result, the fungal and bacterial infections which are often associated with the formation of moisture pockets are not experienced with this shoe. While the invention has been described with preferred embodiments, it is to be understood that variations and modifications are to be considered within the purview and scope of the claims appended hereto.

What is claimed is:

1. Waterproof shoe with a laminate embedded in a molded compound outsole, with a shoe upper comprising at least one outer layer and a laminate positioned against the inner side of the outer layer, which includes at least one waterproof, water vapor permeable interlining and a lining, said outsole having an underside and an upper side facing into the inner area of said shoe, where at least part of the lower area of the outer layer is essentially perpendicular to said underside of the outsole, said laminate having a lower area in said shoe, said lower area of the laminate being essentially parallel with said underside of the outsole, said lower area of the laminate having an upper surface; said upper surface of the lower area of the laminate facing into the inner area of the shoe to form a continuous surface with the upper side of the outsole and is essentially parallel with said underside of the outsole; the interlining of the laminate being bonded to the outsole in a waterproof manner in said lower area of the laminate and at the extreme edge of the laminate; and the lower area of the outer layer is joined to the laminate exclusively via the outsole.

2. Waterproof shoe with embedded laminate in accordance with claim 1, wherein the shoe has a spray-moulded outsole, where the outer layer includes means in its lower area which are used for shaping the lower area of the outer layer in the region of the outsole and which are joined to the outer layer.

3. Waterproof shoe with embedded laminate in accordance with claim 2, wherein the shoe includes means used for shaping in the toe area of the outsole.

4. Waterproof shoe with embedded laminate in accordance with claim 2, wherein the shoe includes means used for shaping in the shank area of the outsole.

5. Waterproof shoe with embedded laminate in accordance with claims 2, wherein the means used for shaping is an extension.

6. Waterproof shoe with embedded laminate in accordance with claim 5, wherein the extension is the lower area of the outer layer which is turned back towards the inner area of the shoe and the extension has a cutout at the front tip of the toe area such that when the extension is turned back it lies flat against the side of the lower area of the outer layer facing into the inner area of the shoe.

7. Waterproof shoe with embedded laminate in accordance with claim 2, wherein the means used for shaping comprises a flat textile structure which is permeated by the synthetic material of the outsole.

8. Waterproof shoe with embedded laminate in accordance with claim 3, wherein the means used for shaping is a guide loop with a drawstring.

9. Waterproof shoe with embedded laminate in accordance with claim 8, wherein the guide loop is selected from the group consisting of a seam or a loop which is sewn on.

10. Waterproof shoe with embedded laminate in accordance with claim 8, wherein the guide loop is a sewn-on loop formed by turning back the lower area of the outer layer.

11. Waterproof shoe in accordance with claim 3, wherein said toe area of the outsole is in the front area of the outsole.

* * * * *